United States Patent
Tam et al.

(10) Patent No.: US 9,136,509 B2
(45) Date of Patent: Sep. 15, 2015

(54) BATTERY CELL WITH AN INTEGRATED POUCH METAL FOIL TERMINAL

(75) Inventors: Ching Yu John Tam, Los Gatos, CA (US); Craig C. Birrell, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 942 days.

(21) Appl. No.: 13/118,025

(22) Filed: May 27, 2011

(65) Prior Publication Data

US 2012/0299555 A1 Nov. 29, 2012

(51) Int. Cl.

| | |
|---|---|
| *G01N 27/416* | (2006.01) |
| *H01M 2/02* | (2006.01) |
| *H01M 10/44* | (2006.01) |
| *H01M 10/46* | (2006.01) |
| *H01M 10/48* | (2006.01) |
| *H02J 7/00* | (2006.01) |
| *H01M 10/42* | (2006.01) |

(52) U.S. Cl.
CPC .......... *H01M 2/0212* (2013.01); *H01M 2/0272* (2013.01); *H01M 2/0285* (2013.01); *H01M 10/44* (2013.01); *H01M 10/46* (2013.01); *H01M 10/48* (2013.01); *H02J 7/0073* (2013.01); *H02J 7/0086* (2013.01); *H01M 2010/4271* (2013.01)

(58) Field of Classification Search
CPC .................................................. G01R 19/16542
USPC .......... 429/61, 79, 90, 91, 179; 324/433, 434, 324/435, 426, 500, 509, 512, 522; 361/42, 361/78, 79, 86, 88; 702/57–65; 320/112, 320/113

See application file for complete search history.

(56) References Cited

U.S. PATENT DOCUMENTS

| | | | | |
|---|---|---|---|---|
| 6,225,778 | B1 * | 5/2001 | Hayama et al. | 320/112 |
| 6,236,216 | B1 * | 5/2001 | Shimoyama et al. | 324/434 |
| 6,296,967 | B1 | 10/2001 | Jacobs et al. | |
| 6,319,630 | B1 * | 11/2001 | Hasegawa et al. | 429/162 |
| 7,609,028 | B2 | 10/2009 | Ha et al. | |
| 7,666,542 | B2 * | 2/2010 | Takamatsu | 429/90 |

(Continued)

FOREIGN PATENT DOCUMENTS

| | | |
|---|---|---|
| EP | 1120846 A1 | 8/2001 |
| JP | 2005251685 A | 9/2005 |

(Continued)

OTHER PUBLICATIONS

PCT International Search Report and Written Opinion of the International Searching Authority for PCT/US2012/037265, mailed Oct. 1, 2012.

(Continued)

*Primary Examiner* — Richard Isla Rodas
*Assistant Examiner* — Michael Dibenedetto
(74) *Attorney, Agent, or Firm* — Blakely, Sokoloff, Taylor & Zafman LLP

(57) ABSTRACT

A battery includes a battery cell having a pair of cell electrodes that are encased in a laminated pouch. The laminated pouch has a conductive moisture barrier layer that is sandwiched between respective electrically insulating layers. Several terminals are integrated with the pouch, including a first terminal and a second terminal that are directly connected to the first and second cell electrodes, respectively, and a third terminal that is directly connected to the conductive moister barrier layer. Other embodiments are also described and claimed.

24 Claims, 7 Drawing Sheets

(56) References Cited

U.S. PATENT DOCUMENTS

| | | | |
|---|---|---|---|
| 7,714,542 B2 * | 5/2010 | Lee et al. | 320/134 |
| 7,812,568 B2 * | 10/2010 | Yonezawa | 320/116 |
| 2005/0099162 A1 * | 5/2005 | Ding | 320/141 |
| 2005/0130037 A1 * | 6/2005 | Kaneta et al. | 429/178 |
| 2006/0275656 A1 * | 12/2006 | Feddrix et al. | 429/179 |
| 2007/0054157 A1 | 3/2007 | Ryu et al. | |
| 2007/0072060 A1 | 3/2007 | Chang et al. | |
| 2008/0066298 A1 * | 3/2008 | Lin et al. | 29/623.1 |
| 2008/0070067 A1 | 3/2008 | Jang et al. | |
| 2009/0051323 A1 | 2/2009 | Sato et al. | |
| 2009/0311584 A1 | 12/2009 | Yamazaki | |
| 2010/0085014 A1 * | 4/2010 | Saeki et al. | 320/134 |
| 2010/0085015 A1 * | 4/2010 | Hamaguchi et al. | 320/134 |
| 2010/0207586 A1 | 8/2010 | Kim | |
| 2010/0221584 A1 * | 9/2010 | Reber | 429/7 |
| 2010/0297494 A1 * | 11/2010 | Chen | 429/179 |

FOREIGN PATENT DOCUMENTS

| | | | | |
|---|---|---|---|---|
| JP | 2005251685 A | * | 9/2005 | H01M 10/40 |
| KR | 20050036633 A | | 4/2005 | |
| WO | WO2010/038136 A1 | | 4/2010 | |
| WO | WO 2010038136 A1 | * | 4/2010 | |
| WO | WO-2010044572 A2 | | 4/2010 | |
| WO | WO 2010044572 A2 | * | 4/2010 | |

OTHER PUBLICATIONS

"Cell Construction", Electropaedia, Battery and Energy Tech, Components, Feb. 18, 2011, Copyright Woodbank Communications Ltd. 2005, Internet at: http://www.mpoweruk.com/glossary.htm, (12 pages).

"Using Lithium Polymer Batteries in Portable Devices", Micro Power Electronics, White Paper, May 2010, Internet PDF/Adobe Acrobat download at: www.micro-powercom/userfiles/file/wp_polymer_final-1274743697.pdf, (pp. 1-11).

PCT International Preliminary Report on Patentability for PCT/US2012/037265, mailed Dec. 12, 2013.

\* cited by examiner

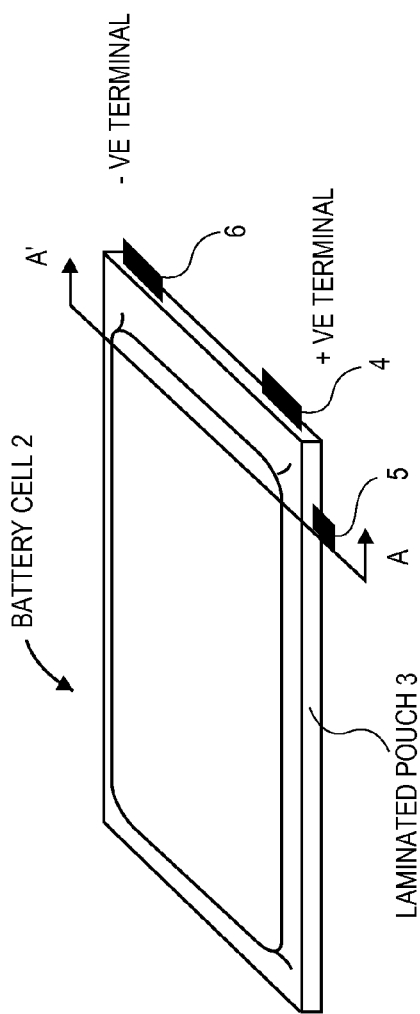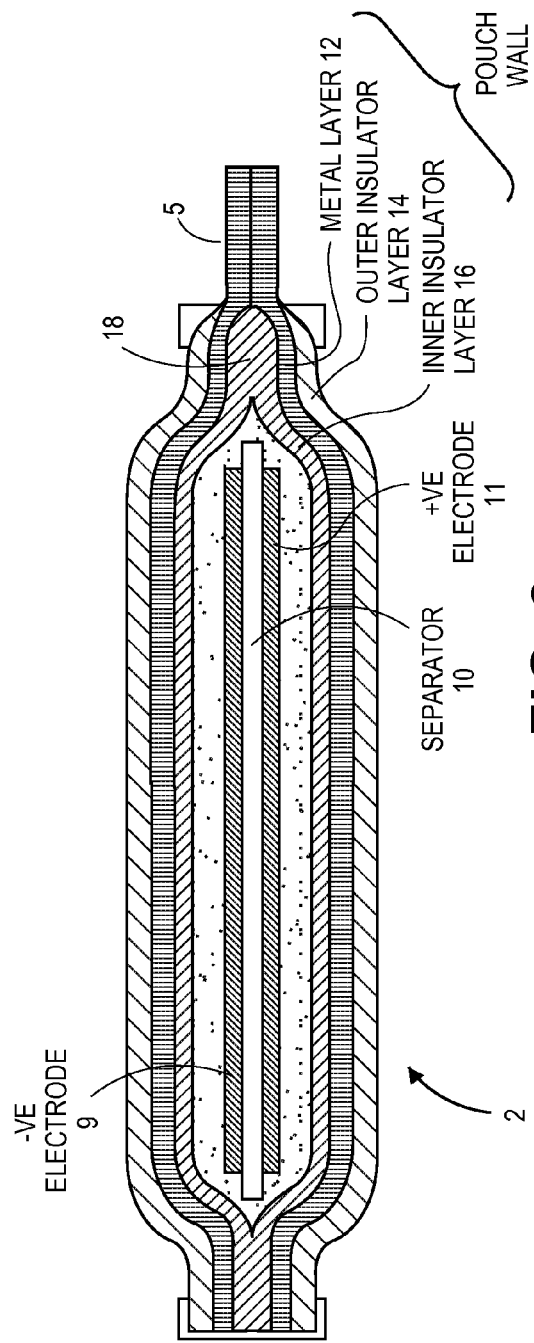
FIG. 1
FIG. 2

BATTERY CELL WITH AN INTEGRATED POUCH METAL FOIL TERMINAL

An embodiment of the invention relates to a method for charging a rechargeable battery cell that is encased in a pouch made of electrically insulated metal foil. Other embodiments are also described.

BACKGROUND

Rechargeable batteries (some times referred to as secondary batteries) used for powering consumer electronic mobile devices are the subject of much research and development. Mobile devices such as smart phones, tablet computers, and laptop or notebook computers are being developed with increasing functionality and performance, which has led to a demand for lower cost yet more powerful rechargeable batteries. There is also a need that the rechargeable battery used in advanced mobile devices be as small as practical, read as thin as possible.

Currently, lithium secondary batteries having lithium ion and lithium ion polymer chemistries have the needed energy density and the requisite thin form factor to be the preferred choice for powering a mobile device. Recently, much interest has been shown in a lithium battery cell whose electrochemical structure (which includes a pair of electrodes, separator, and electrolyte) are encased in a flexible, lightweight pouch. The cell pouch is a flexible, sealed casing in which a single cell is contained. The pouch is flexible in that it may be expected to swell during charge or discharge or as the cell heats up. It is sealed in that it prevents any components of the electrochemical structure of the cell, including the electrolyte in particular, from leaking out.

Typically, the pouch wall has a foil construction that includes a metal foil, which is insulated from the cell's electrochemical structure and from the outside world by being laminated between at least two insulating layers. The metal foil laminate acts as a protective moisture barrier, preventing water and moisture from entering the pouch. The metal foil is thus external to and electrically insulated from the electrochemical structure of the cell that is contained in the pouch. The metal foil is also electrically insulated on the outside of the cell.

The metal foil of the pouch should not be electrically biased. For instance, the metal foil should at all times remain electrically "floating" or sufficiently disconnected (electrically) from any electrical power source. This desired characteristic may be verified during production or laboratory testing of the cell, by performing a dc impedance measurement using an ohmmeter, during which an ohmmeter probe is temporarily placed into contact with the metal foil. This is to ensure that the foil is electrically insulated; if the measurement reveals sufficiently low impedance between the foil and a power terminal of the cell, then the cell is identified as being defective.

SUMMARY

An embodiment of the invention is a battery having a battery cell with an integrated pouch metal foil terminal. The cell is composed of a laminated pouch that has a conductive moisture barrier layer such as a metal foil that is sandwiched between respective electrically insulating layers. Several electrical terminals are integrated with the pouch. There are two power terminals that are directly connected to the two battery cell electrodes, respectively, and a third terminal (referred to as the integrated pouch metal foil terminal) that is directly connected to the conductive moisture barrier layer. A monitoring circuit, which may be integrated with the battery cell, is coupled to the electrodes or the power terminals to monitor an operating parameter of the battery. The monitoring circuit is further coupled to the conductive moisture barrier layer or the foil terminal to indicate the degree to which the conductive moisture barrier layer is electrically biased, and/or the degree to which the layer is floating. Several different types of monitoring circuits are described.

Another embodiment of the invention is an automated method for charging a rechargeable battery that is encased in a pouch made of electrically insulated metal foil. The method includes sensing the voltage of the metal foil and comparing the sensed voltage to a threshold. Based on the comparison, the battery is either allowed to charge or the battery is prevented from being charged. For instance, the sensed voltage may be compared to an upper dc threshold and/or a lower dc threshold, a result of which may indicate that the metal foil is deemed to be biased and/or no longer floating. In that case any ongoing charging of the battery is stopped (to prevent potential swelling of the pouch that may be caused by the biased or non-floating metal foil). In another scenario, the battery may be allowed to continue to charge so long as the comparison indicates that the metal foil remains unbiased and/or floating.

In another embodiment, the voltage of the metal foil is sensed while an ac signal source is coupled to the metal foil. The metal foil voltage in that case may also be sensed via capacitive, rather than dc, coupling. The sensed foil voltage may then be used to measure the resulting frequency-dependent impedance or load that is being driven by the ac signal source. If the measured impedance is within an expected range (e.g., predominantly capacitive), then the pouch is deemed unbiased or floating. But if the behavior of the load is outside the expected range (e.g., has a significant resistive component) then the conclusion is that the pouch is biased or not floating.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 1 is a perspective view of a battery cell, in accordance with an embodiment of the invention.

FIG. 2 is a sectional view of the battery cell taken from the location indicated in FIG. 1.

DETAILED DESCRIPTION

Figure 3:
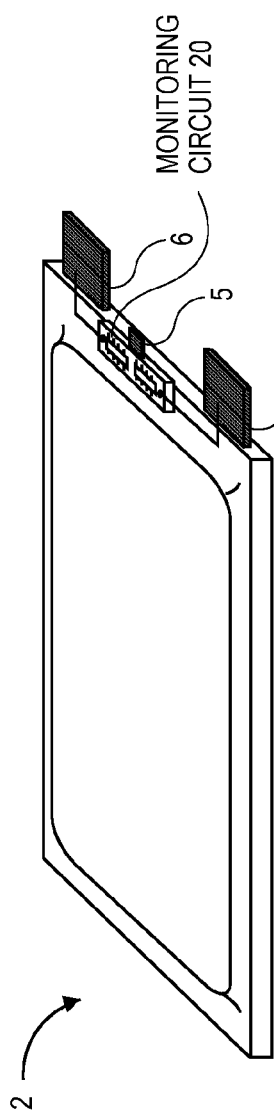
FIG. 3 is a perspective view of a battery cell according to another embodiment of the invention.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

FIG. 1 is a perspective view of a battery cell 2, in accordance with an embodiment of the invention. The battery cell 2 has an electrochemical structure that produces power and that is encased in a laminated pouch 3. An example of the electrochemical structure is depicted in the cross-section view of FIG. 2, showing a negative electrode 9 and a positive electrode 11 sandwiching a separator 10, all in the presence of an electrolyte which backfills the inside cavity of the pouch 3. The laminated pouch 3 has a pouch wall, which is made of a conductive moisture barrier layer 12 (also referred to as a metal foil or metal layer 12) that is sandwiched between an inner insulating layer 16 and an outer insulating layer 14. A joint has been formed where the inner insulator 16 of a lower half of the pouch comes into contact with an upper half of the pouch as shown, in what is referred to as a sealing region 18. The pouch 3 in this manner serves as the containment unit of a battery's electrochemical cell, where in this case a single cell is shown as being contained within the pouch. Note that in another embodiment, an "outer" pouch (which may be similar in construction to the pouch 3) may contain several individually encased, "inner" pouch cells that are electrically connected in series with each other or in parallel with each other, to form a battery pack. The term "battery" by itself is thus used here, in different instances, to refer to a single battery cell or a battery pack with multiple cells.

Still referring to FIG. 1 and FIG. 2, the battery cell 2 has a number of electrical terminals that are integrated with the pouch 3. These include a positive terminal 4 and a negative terminal 6, which are power terminals that are directly connected to the respective battery cell electrochemical structure electrodes, respectively. In addition, there is a third terminal 5 also referred to as a pouch metal foil terminal 5 that is directly connected to the conductive moisture barrier layer or metal layer 12, which forms part of the pouch wall. As seen in the sectional view of FIG. 2, these terminals emerge from the pouch 3 in regions that are sealed off against leakage of any electrochemical compound of the cell. In the example of FIG. 2, the pouch foil terminal 5 is a tongue-like extension of the metal layer 12; in contrast, the power terminals 4, 6 may be separate pieces of metal that have been placed within openings in the pouch wall and soldered to their respective electrodes, which openings have then been sealed off.

In one embodiment, the pouch metal foil terminal 5 is exposed after the pouch has been formed, by stripping off the inner and outer insulator layers 16, 14 from its opposing faces as shown. Note that the edge of the pouch wall should otherwise be completely insulated all around as shown, so that the exposed edge of the metal layer 12 does not inadvertently come into contact with another conductor outside of the battery cell 2. Such contact would most likely cause an undesired voltage bias to develop on the metal layer 12. The construction of the pouch 3 may otherwise be in accordance with conventional techniques, where a multilayer laminated sheet is folded over the electrochemical structure of the electrodes 9, 11 and separator 10, and then heat sealed at its edges as shown to produce region 18, thereby forming a pouch. An opening may be reserved in the pouch so as to allow the inside cavity of the pouch to be back filled, for example, with an electrolyte. The positive and negative terminals 4, 6 may be added in accordance with conventional techniques used, for example, in the manufacture of lithium ion polymer pouch cells. Thereafter, all openings of the pouch including those for the two power terminals 4, 6 and the backfilling opening are sealed (e.g., heat sealed to form the region 18), and then an edge of the pouch is cut so as to leave a tongue extension being the terminal 5. Other ways of forming the terminal 5 are possible, including soldering or gluing (using conductive adhesive) a separate piece of metal to the tongue extension.

Figure 4:
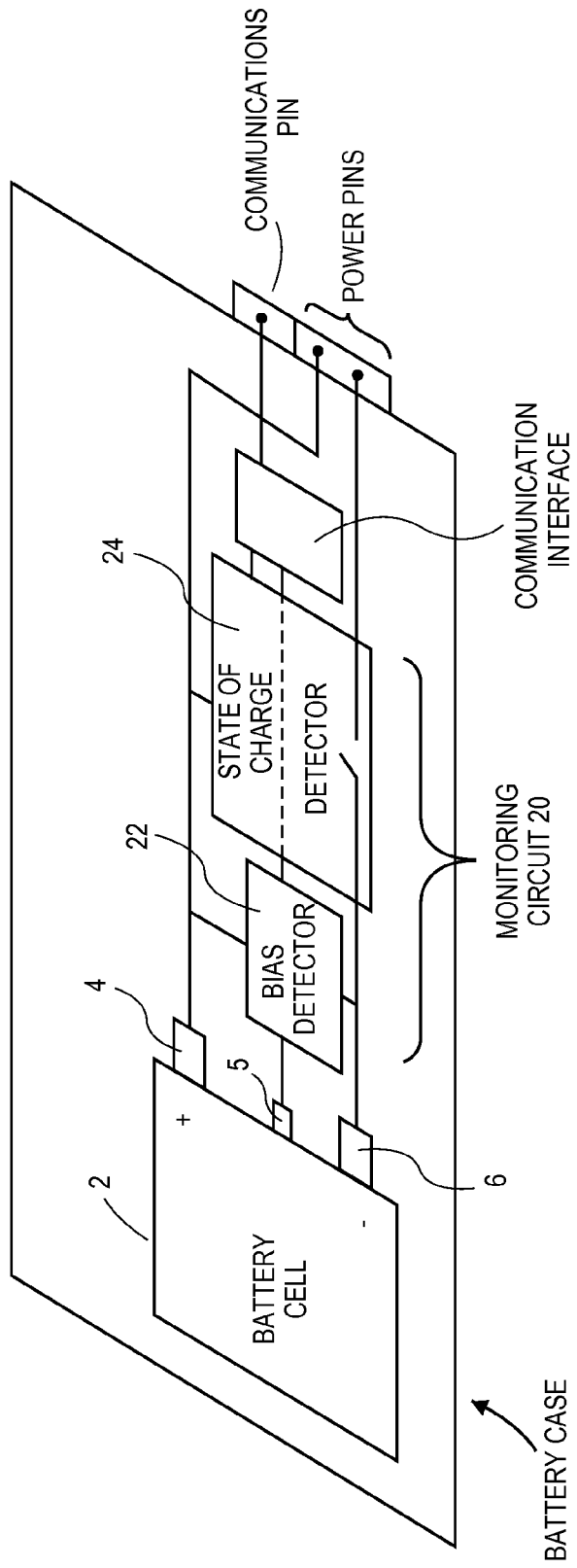
FIG. 4 is a circuit diagram of a battery with an integrated monitoring circuit.

The bias or float status of the metal layer 12 may be monitored using a monitoring circuit 20 that may be integrated with either the battery cell 2, or battery charger circuitry within the host mobile device. FIG. 3 and FIG. 4 depict an embodiment where the monitoring circuit 20 is integrated with the battery cell 2. The monitoring circuit 20 is coupled to the power terminals or electrodes of the cell 2, and may be encased either within the pouch 3 or within an outer cover of the battery (outside of the inner pouch). The monitoring circuit 20 serves to monitor an operating parameter of the battery, including, for example, a state of charge parameter, power terminal voltage, power terminal current output, and/or cell temperature. The monitoring circuit 20 may be implemented on its own separate printed circuit board such as depicted in FIG. 3 with electrical connections to the power terminals 4, 6, and the pouch foil terminal 5. Note that in the embodiment of FIG. 3, the pouch foil terminal 5 has been formed in the side of the cell 2 through which the power terminals 4, 6 emerge. However, other locations for the pouch foil terminal 5 are possible.

The monitoring circuit 20 may include a state of charge detector 24 which in addition to monitoring an operating parameter of the battery cell 2 includes a battery disconnect (depicted in FIG. 4 as a switch symbol). The latter may be used to automatically disconnect one or more of the battery cell power terminals 6, 4 in the event that the operating parameter being monitored reflects a potential problem for continued charging or discharging of the battery cell 2. Conventional techniques to implement the state of charge detector 24 including the battery power disconnect feature may be used.

In addition to a state of charge detector 24 (see FIG. 4) the monitoring circuit has a bias detector 22. The latter senses the voltage of the pouch metal foil and on that basis may indicate the degree to which the pouch metal foil is biased and/or floating, i.e. electrically disconnected from an electrical power source such as the power terminals of the battery cell 2. The indication may be in binary form, such as floating and not floating, or biased and unbiased. Alternatively, the indication of the degree of float or bias may reflect greater granularity, such as low, medium and high. This information may be provided to a battery charger circuit, through a suitable communications interface, e.g. one that uses $I^2C$ circuitry (see I²C-bus specification and user manual rev. 03, 19 Jun. 2007), which may also be onboard with the monitoring circuit 20, i.e. on the same printed circuit carrier. The communications interface may contain one or more communications pins, which would be in addition to the power pins as shown in FIG. 4, for instance as part of separate connectors, that are also integrated with the battery cell 2.

Figure 5:
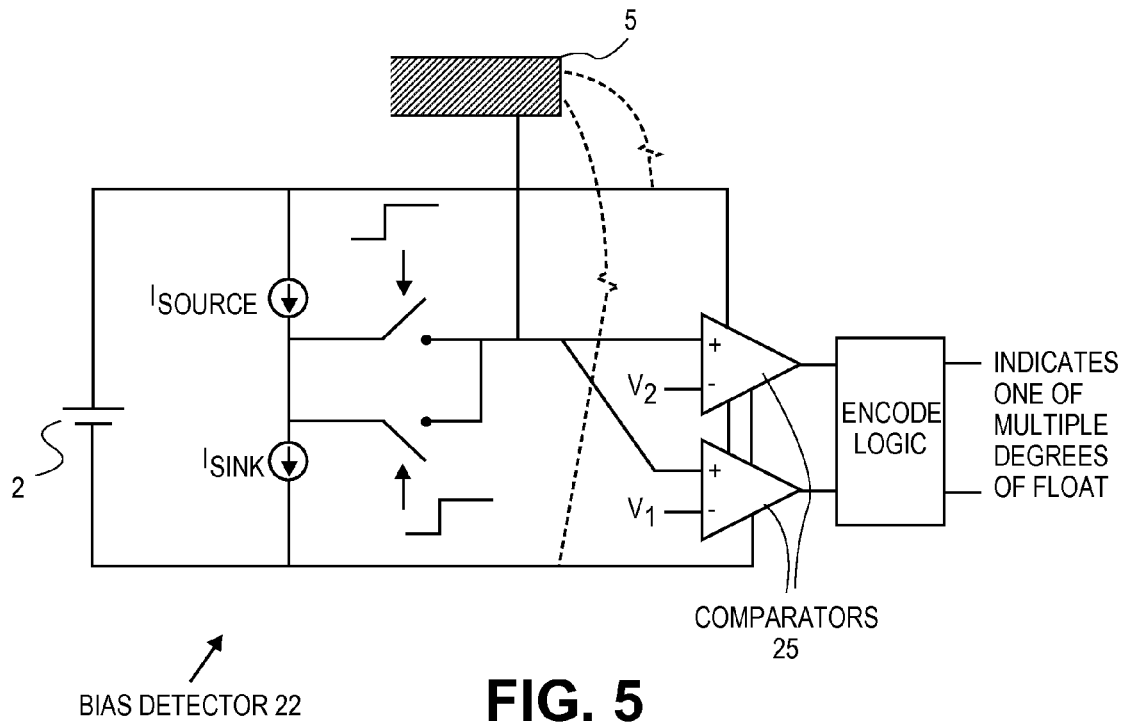
FIG. 5 is circuit schematic an example bias detector used in the monitoring circuit.
Figure 6:
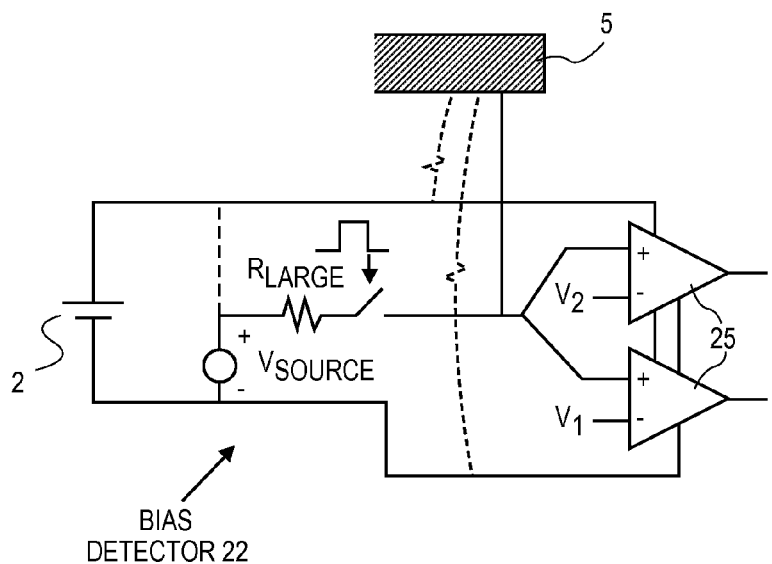
FIG. 6 is a circuit schematic of another example bias detector.

Referring now to FIG. 5 and FIG. 6, two example circuit schematics for implementing the bias detector 22 are shown. The presence of a bias voltage or a non-floating condition on the terminal 5 may be due to the existence of sufficiently low resistance coupling the pouch metal foil to the positive or and/or negative power terminals of the battery cell 2. This is depicted in the figures as two resistors that are drawn in dotted lines.

To detect the bias or float condition of the terminal 5 using the embodiment of FIG. 5, a process that involves two checks can be performed. In such a process, Isink and Isource are applied alternately to the terminal 5 (e.g., using the switch arrangement shown), while sensing the voltage on the terminal 5 using a window comparator (e.g., analog comparators 25 with lower threshold V1 and upper threshold V2). The applied current Isource may be a dc current that is, in this case, sourced from the positive power terminal of the battery cell 2 (as opposed to an external power supply or test equipment power supply). As to Isink, this may be a dc current sink into the negative power terminal of the cell 2. The sensed voltage of the terminal 5 may be relative to the voltage of either the positive or the negative power terminal of the battery cell 2. The output of the window comparator may be encoded and then provided to the communications interface (see FIG. 3), to indicate one of in this case three different degrees of float or bias: less than V1, between V1 and V2, and greater than V1 (wherein V1 and V2 are suitable thresholds selected in view of the expected levels of float, the values of Isource and Isink, and the nominal cell voltage (e.g., 3.7 Volts for a lithium ion polymer cell). Of course, a single comparator may alternatively be used, to provide a binary indication of the degree of bias or float. Note that the terminal 5 voltage may be sensed by a separate amplifier or preamplifier, before being fed to an input of the comparator 25.

Still referring to FIG. 5, the process may proceed as follows. Terminal 5 may be first checked by applying Isource (and not Isink) to the terminal 5: if the sensed voltage is greater than V2, then the first check passes and so the process jumps to the second check; if however the sensed voltage is less than V1 then the first check fails, and thus terminal 5 is not sufficiently floating and/or is biased. If the first check fails, charging of the battery cell 2 should be halted immediately.

If the first check passes as above, then the second check is to apply Isink (and not Isource): here, if the sensed voltage is less than V1, then the second check passes and so the terminal 5 is deemed to be sufficiently floating and/or unbiased (since both the first and second checks have passed); if however the sensed voltage is greater than V2 then the second check fails, and thus terminal 5 is not sufficiently floating (and/or is biased). If the second check fails, charging of the battery cell 2 should be halted immediately.

Note that the values of V1 and V2 for the first check may be different than their values for the second check. Also, the order in which the first and second checks are performed in the process is not material. In other words, the process could also work by starting with the second check and then jumping to the first check (if the second check passes).

In one embodiment, there may be one or more intermediate float conditions defined for the terminal 5. These may correspond to a case where the sensed voltage (during the first and/or the second checks) lies between V1 and V2. This may be used to indicate an intermediate degree of float in which case the charge current could still be reduced (in response to the indication), but not halted.

FIG. 6 is another arrangement for the bias detector 22, where the pouch foil terminal 5 is "pulsed", i.e. forced to a predetermined voltage for a predetermined duration and then released. This is depicted by the dc voltage source having a value Vsource, that is between zero and the battery cell voltage, e.g. about half way between those two limits, coupled to the terminal 5 through a resistor Rlarge, and that is switched on for the pulse duration, and then switched off. The resistance of Rlarge should be on the order of the normal, expected leakage resistance between the pouch metal foil and the negative power terminal of the battery cell 2, and may be somewhat larger than this expected leakage resistance. This will force the terminal 5 to an initial value, in this case about one-half the Vsource value, when the dc voltage is switched on. When the dc voltage is then switched off, no current is being applied (sink or source) to the pouch foil terminal. In that case, if the metal foil is floating or not biased, then the initial value of Vsource should be maintained essentially unchanged on the terminal 5 for a certain period of time after having switched off the dc voltage. This should be expected given the relatively high leakage resistance of the pouch metal foil and provided that the terminal 5 is floating and/or unbiased. The degree of float may thus be ascertained by sensing the voltage on the terminal 5 at the end of the given period of time, comparing it to a known threshold, and then reporting out the results, e.g. using the same window comparator and encode logic concept as was used in the FIG. 5 embodiment.

Figure 7:
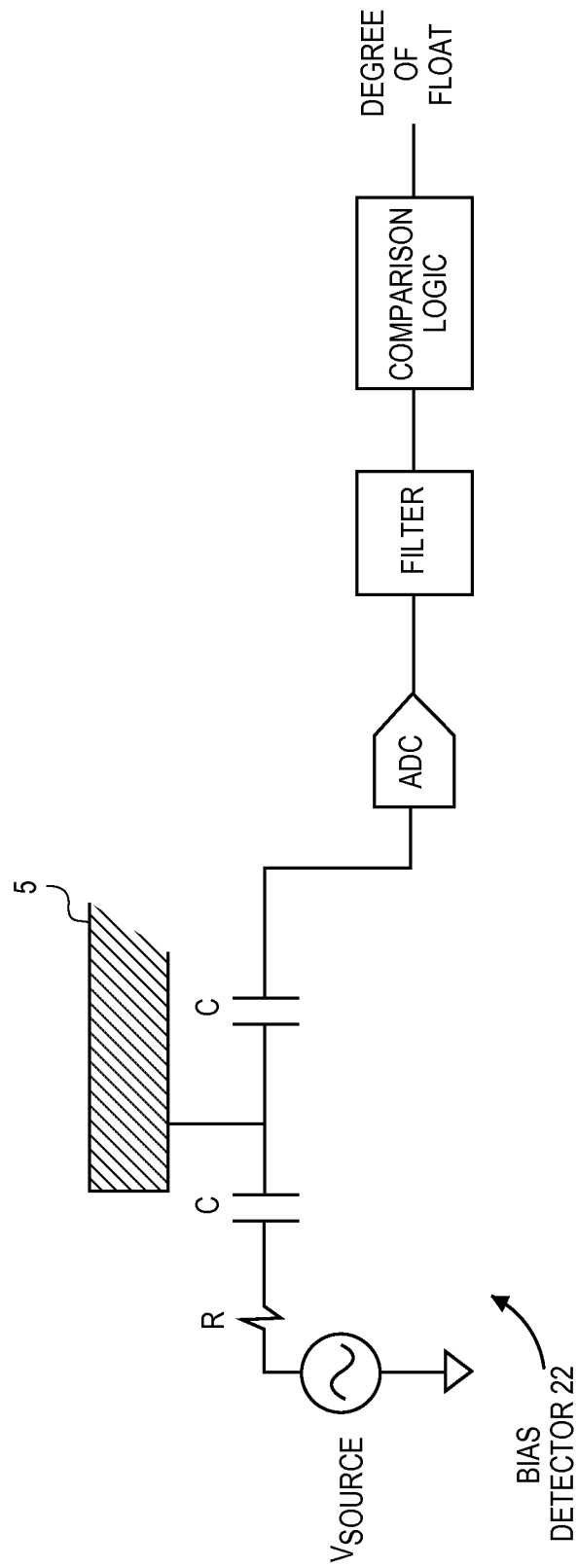
FIG. 7 is circuit schematic of yet another example bias detector.

Referring now to FIG. 7, another example circuit for the bias detector 22 is shown, where here Vsource is an ac signal source that is capacitively coupled to the terminal 5. The signal source may produce a fixed frequency sinusoid, or it may be variable and swept. The metal foil voltage may also be sensed capacitively. The two series capacitors may be designed to provide non-negligible impedance at the frequencies of the signal source. The resistance of Rlarge may be on the order of the normal, expected leakage resistance between the pouch metal foil and the negative power terminal of the battery cell 2. Following analog to digital conversion, the sensed voltage may be applied to a digital filter whose frequency response has been tuned to an expected range (in view of the non-negligible impedance presented by the two series capacitors). The filter thus provides a measure of the frequency-dependent impedance or load that is being driven by the ac signal source. If the measured impedance is predominantly capacitive (as determined by the comparison logic), then the pouch is deemed unbiased or floating. But if the behavior of the load is outside the expected range (e.g., has a significant resistive component or exhibits a substantial signal drop in the frequency range of interest), then the conclusion is that the pouch is biased or not floating.

Figure 8:
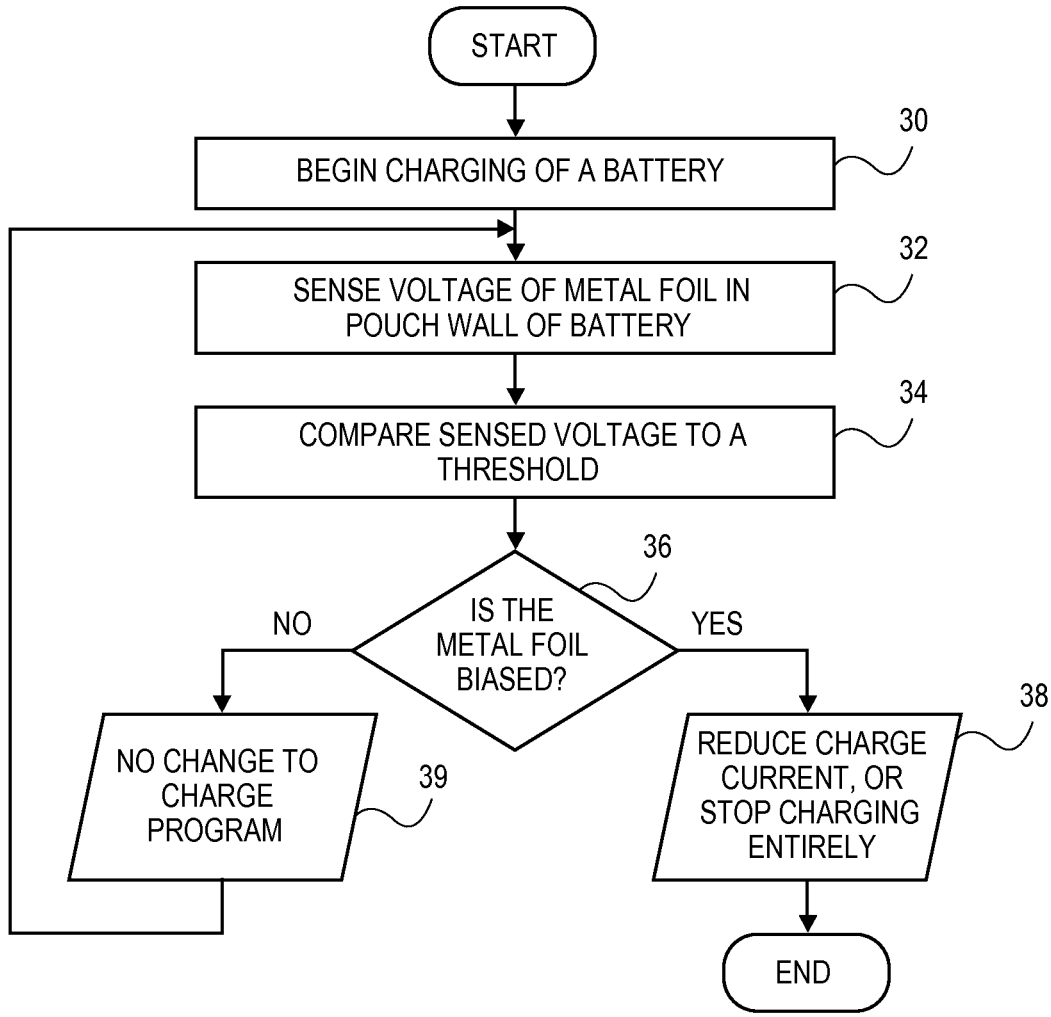
FIG. 8 is a flow diagram of an automated method for charging a rechargeable battery.

FIG. 8 is a flow diagram of an automated method for charging a rechargeable metal foil pouch battery, while being informed about the float or bias state of the metal foil pouch. Operation begins with the charging program being initiated (block 30). The program may involve checking the state of charge of the battery, and then initiating an appropriate charge current. Thereafter, the voltage of the metal foil in the pouch wall of the battery is sensed (block 32). This may occur continuously, while the charging procedure continues. As described above, the voltage of the pouch metal foil may be sensed—see FIG. 5 for instance, where analog comparators 25 are used to sense and compare the terminal 5 voltage to one or more predetermined thresholds (block 34). Note that as an alternative to the analog comparison arrangement shown in FIG. 5 and in FIG. 6, the comparison may be performed digitally. For instance, the voltage on the terminal 5 may be sampled and then digitized prior to performing further analysis (e.g., a comparison to a threshold) in the digital domain. See also FIG. 7. In that case, the needed analog to digital conversion circuitry may be on-chip with, or on board with (i.e., in the same printed circuit board as), the monitoring circuit 20, while the threshold and comparison operations may be programmed into an external processor that obtains the digitized samples from the communications interface that is associated with the monitoring circuit 20 (see FIG. 4).

In one embodiment, a predetermined current is applied to the metal foil while sensing the voltage in block 32 (see FIG. 5). This may be a relatively small amount of current, for instance, on the order of 1 mA or smaller. The voltage threshold is selected in view of the amount of the applied current, as well as the voltage at the power terminals of the battery, where the battery is used to provide the applied current. If the metal foil is deemed to be biased, or not sufficiently floating (block 36), then this causes the charge current to be reduced or even the charging to stop entirely (block 38). On the other hand, if the voltage comparison indicates that the metal foil is not biased and/or is sufficiently floating, then the charge program may continue unchanged (block 39). The process may then repeat with block 32 by continuing to sense the voltage of the metal foil and checking for whether the metal foil is biased or not. Note that in block 38, in response to the metal foil being found to be biased or not floating, charging may be stopped entirely in the sense that the actual charge current is not allowed to increase, or, in other words, actual charging is prevented from starting. In a similar vein, in block 39 where the charge program is allowed to continue unchanged, this may mean that, for example, actual charge current is allowed to continue unchanged, a new charge cycle is allowed to start, or the current charge current is allowed to increase.

Figure 9:
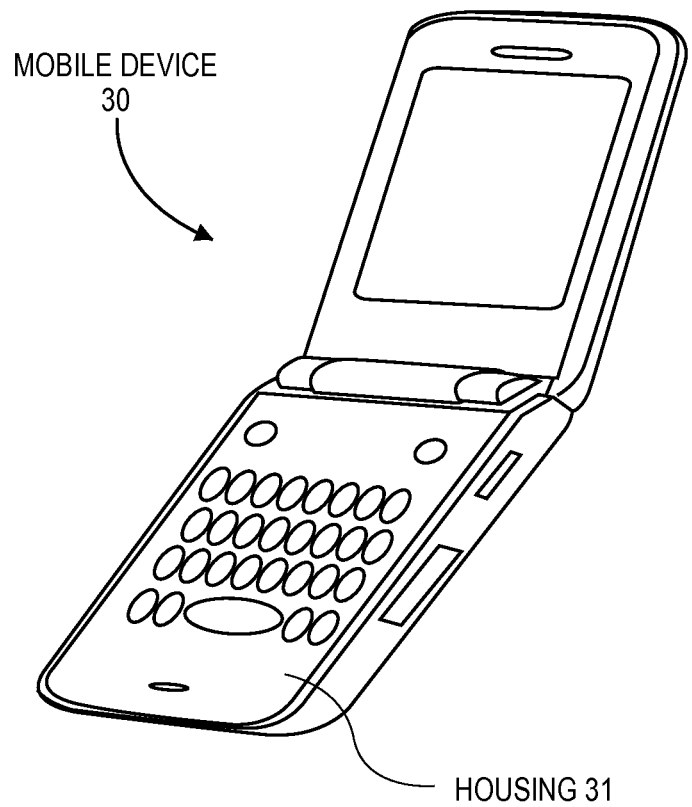
FIG. 9 is a perspective view of an example host mobile device in which a battery, in accordance with an embodiment of the invention, may be used.
Figure 10:
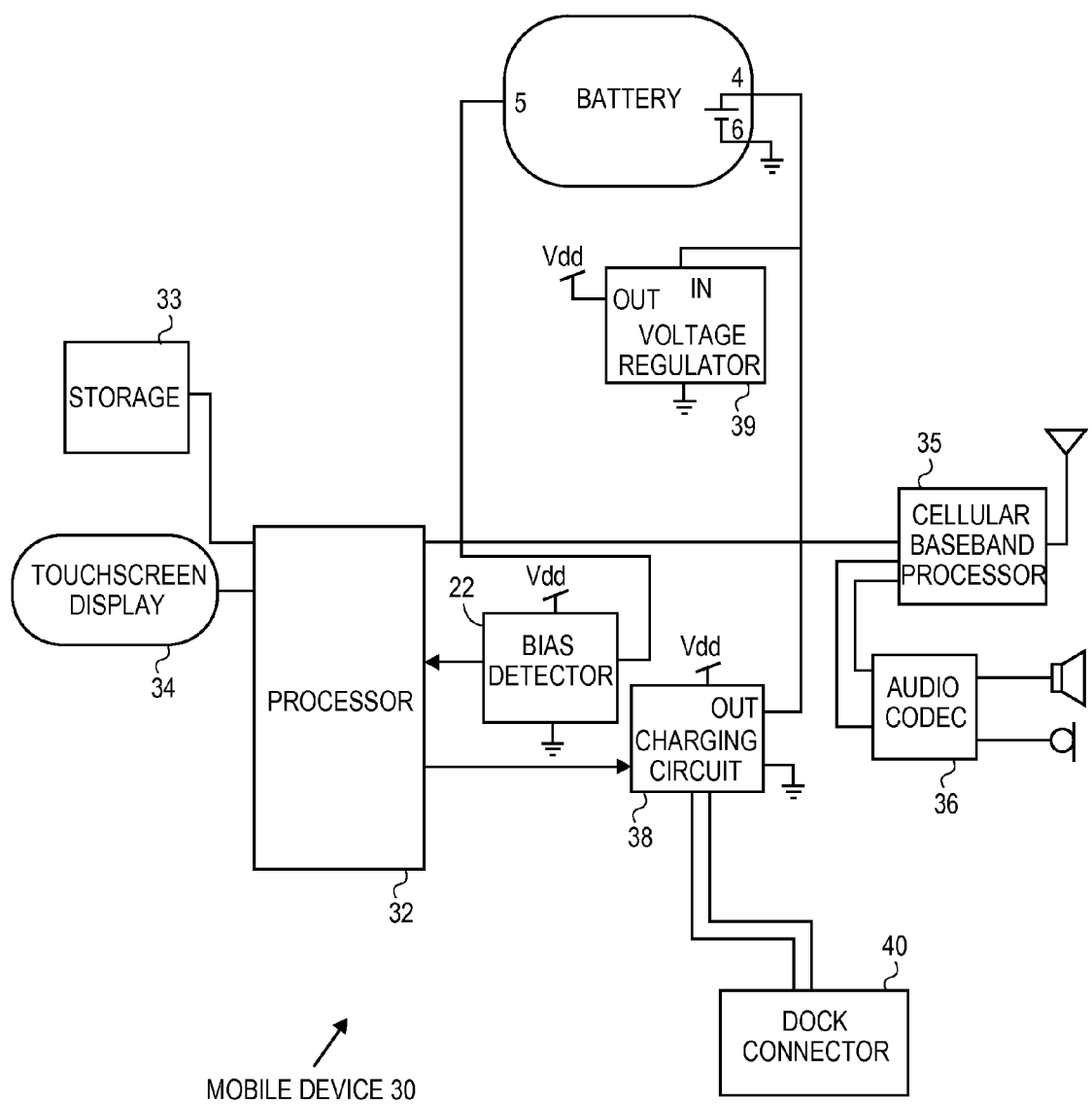
FIG. 10 is a combined circuit schematic and block diagram of certain components of a host mobile device.

FIG. 9 is a perspective view of an example host mobile device 30 in which a battery, in accordance with an embodiment of the invention, may be used. The mobile device 30 depicted here is a smart phone having a housing 31 in which are integrated a battery, the bias detector 22, and the various components shown in FIG. 10. Referring to FIG. 10, this is a combined circuit schematic and block diagram of certain relevant components of the mobile device 30. The bias detector 22 is depicted as being powered by a regulated power supply voltage Vdd, as derived from the battery power terminals 4, 6, by a voltage regulator 39. Similarly, the Vdd power supply may be used to power the control circuitry in a charging circuit 38. The latter is responsible for low-level control of battery charge current, drawing the battery's charge current from an external power source (not shown) through a dock connector 40. The external power source may be, for instance, an ac wall power adapter (e.g., a Universal Serial Bus compliant power adapter), a desktop computer, an automobile power adapter, or other source of power for charging the battery. Note that the bias detector 22 may be integrated with the battery charging circuit 38 as part of a single integrated circuit package, e.g. a power management unit. Alternatively, the two may be integrated by being installed on the same printed circuit carrier.

Control of the charging circuit 38, including determining whether or not a charge program should be altered, may be performed by a processor 32 that has been programmed in accordance with software (stored in a data storage 33) that implements a suitable battery charging algorithm. The programmed processor 32 responds to an indication of the degree of float or bias of the battery, which may be provided by the bias detector 22, and in response signals the charging circuit 38 to either change or maintain the charge program (as described in detail above in connection with FIGS. 4-8). As an alternative, the processor 32 may determine the degree of float, based on an analysis of digitized samples of the pouch metal foil voltage that have been provided to it by the bias detector 22.

The remaining components in FIG. 10 may be conventional components typically found in a mobile device 30, such as a smart phone, including a touch screen display 34, a cellular baseband processor 35 that is coupled to a radio frequency antenna at one end and to an audio codec 36 at another (to enable a near end user to participate in a telephone call with a far end user, through a coupled near-end speaker and microphone combination as shown). Other well-known functionality such as a digital camera and a self-locating system (e.g., a global positioning system, GPS) may, of course, be included in the mobile device 30.

While certain embodiments have been described and shown in the drawings, it is to be understood that such embodiments are merely illustrative of and not restrictive on the broad invention, and that the invention is not limited to the specific constructions and arrangements shown and described, since various other modifications may occur to those of ordinary skill in the art. For example, the cell electrochemical structure depicted in FIG. 2 may be a lithium ion polymer secondary battery structure that can be relatively flat and thin, thereby being particularly effective for use in personal mobile devices such as tablet computers and smart phones. The techniques described here, however, may also be beneficial for charging other types of secondary battery electrochemical structures whose operation may be adversely affected when an electrical bias develops on the metal foil of the pouch casing. The description is thus to be regarded as illustrative instead of limiting.

What is claimed is:

1. An automated method for charging a rechargeable battery that is encased in a pouch having a conductive moisture barrier layer made of electrically insulated metal foil, the method comprising:

while charging the battery through first and second power terminals that are directly connected to battery cell electrodes, respectively, and are integrated with the pouch, applying a predetermined current to the metal foil, through a third terminal that is directly connected to the metal foil, while sensing a voltage of the metal foil through the third terminal, wherein the applied current is sourced from a power terminal of the battery;

comparing the sensed voltage to a threshold; and based on the comparison, preventing the battery from being charged.

2. The method of claim 1, wherein the sensed voltage is relative to a voltage of the power terminal of the battery.

3. The method of claim 1 further comprising, while sensing the voltage of the metal foil and comparing the sensed voltage to the threshold:

driving the metal foil with a predetermined dc voltage for a predetermined duration; then releasing the metal foil from the predetermined voltage.

4. An automated method for charging a rechargeable battery that is encased in a pouch having a conductive moisture barrier layer made of electrically insulated metal foil, the method comprising:

while charging the battery through first and second power terminals that are directly connected to battery cell electrodes, respectively, and are integrated with the pouch, sensing voltage of the metal foil while driving the metal foil with a predetermined ac voltage source through a third terminal that is directly connected to the metal foil;

filtering the sensed voltage to measure frequency-dependent load that is presented to the ac voltage source;

comparing the measured frequency-dependent load to an expected range; and based on the comparison, allowing the battery to be charged.

5. A battery comprising;

a battery cell having first and second cell electrodes encased in a laminated pouch, the laminated pouch having a conductive moisture barrier layer that is sandwiched between respective electrically insulating layers; and a plurality of electrical terminals integrated with the pouch, including a first terminal and a second terminal that are directly connected to the first and second cell electrodes, respectively, and a third terminal that is directly connected to the conductive moisture barrier layer.

6. The battery of claim 5 wherein the plurality of terminals emerge from the pouch in regions that are sealed off against leakage of an electrochemical compound of the cell.

7. The battery of claim 5 wherein the third terminal is a tongue extension of the conductive moisture barrier layer.

8. The battery of claim 5 further comprising:

a monitoring circuit integrated with the battery cell to monitor an operating parameter of the battery, the monitoring circuit being further coupled to the conductive moisture barrier layer of the pouch to sense voltage of the conductive moisture barrier layer.

9. The battery of claim 5 further comprising:

a monitoring circuit integrated with the battery cell to monitor a voltage of the battery, the monitoring circuit being further coupled to the conductive moisture barrier layer of the pouch to indicate the degree to which the conductive moisture barrier layer is biased.

10. The battery of claim 6 further comprising:

a monitoring circuit integrated with the battery cell to monitor a voltage of the battery, the monitoring circuit being further coupled to the conductive moisture barrier layer of the pouch to indicate the degree to which the conductive moisture barrier layer is biased.

11. The battery of claim 9 wherein the monitoring circuit is to simultaneously a) apply a predetermined current to the conductive moisture barrier layer, and b) compare voltage of the conductive moisture barrier layer to a predetermined threshold.

12. The battery of claim 11 wherein the applied current is sourced from a power terminal of the battery.

13. The battery of claim 9 wherein the monitoring circuit is powered through the first and second terminals of the battery.

14. The battery of claim 9 wherein the monitoring circuit comprises:

a comparator having a first input coupled to the conductive moisture barrier layer and a second input coupled to a threshold voltage;

a dc voltage source at a predetermined voltage; and a switch that couples the dc voltage source to the conductive moisture barrier layer.

15. The battery of claim 9 wherein the monitoring circuit comprises:

an ac signal source capacitively coupled to the conductive moisture barrier layer;

an analog to digital converter, adc, capacitively coupled to the conductive moisture barrier layer; and a digital filter having an input coupled to an output of the adc, to measure load that is being presented to the ac signal source.

16. An apparatus comprising:

a mobile device having a housing in which are integrated a battery having first and second power terminals that are directly connected to battery cell electrodes, respectively, and a bias detector, the battery having a metal foil cell pouch that has a conductive moisture barrier layer being a metal foil which is sandwiched between electrically insulating layers of the pouch, wherein the bias detector is to sense voltage of the metal foil cell pouch through a third terminal that is directly connected to the metal foil, the mobile device to analyze the sensed voltage and in response signal a battery fault, wherein the bias detector comprises:

an ac signal source capacitively coupled to the metal foil cell pouch; and an analog to digital converter capacitively coupled to the metal foil cell pouch to digitize the sensed voltage.

17. The apparatus of claim 16 wherein the bias detector is integrated within a case of the battery.

18. The apparatus of claim 16 wherein the apparatus further comprises a battery charger circuit inside the mobile device housing, and wherein the bias detector is installed on the same printed circuit carrier as the battery charger circuit.

19. The apparatus of claim 16 wherein the mobile device housing ha integrated therein a battery charging circuit that alters a charge procedure of the battery in response to the signaled battery fault.

20. The apparatus of claim 19 wherein the bias detector is to detect that the metal foil cell pouch is not biased by making a comparison of the sensed voltage to a predetermined threshold, and wherein the battery charging circuit in response maintains unchanged a charge procedure of the battery.

21. The apparatus of claim 16, wherein the mobile device is to analyze the digitized sensed voltage to measure frequency dependent impedance presented to the ac signal source.

22. An automated method for charging a rechargeable battery through first and second power terminals, wherein the battery is encased in a pouch having a conductive moisture barrier layer made of electrically insulated metal foil and a third terminal that is directly connected to the metal foil, the method comprising:

driving the metal foil through the third terminal with a predetermined dc voltage source for a predetermined duration;

releasing the metal foil from the predetermined voltage source after the predetermined duration;

sensing a voltage of the metal foil through the third terminal after the predetermined duration;

comparing the sensed voltage to a threshold; and based on the comparison, preventing the battery from being charged through the first or second power terminals.

23. The method of claim 22, wherein the predetermined dc voltage source is sourced from a power terminal of the battery.

24. The method of claim 23, wherein the sensed voltage is relative to a voltage of the power terminal of the battery.

* * * * *